US009296259B2

(12) United States Patent
Numata (10) Patent No.: US 9,296,259 B2
(45) Date of Patent: Mar. 29, 2016

(54) PNEUMATIC TIRE

(75) Inventor: Kazuki Numata, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 1023 days.

(21) Appl. No.: 13/444,159

(22) Filed: Apr. 11, 2012

(65) Prior Publication Data

US 2012/0261044 A1 Oct. 18, 2012

(30) Foreign Application Priority Data

Apr. 12, 2011 (JP) .................................. 2011-088515

(51) Int. Cl.
*B60C 11/11* (2006.01)
*B60C 11/03* (2006.01)
*B60C 11/04* (2006.01)

(52) U.S. Cl.
CPC ............. *B60C 11/0304* (2013.04); *B60C 11/04* (2013.01); *B60C 11/11* (2013.01); *B60C 2011/0346* (2013.04); *B60C 2011/0353* (2013.04); *B60C 2011/0365* (2013.04); *B60C 2011/1209* (2013.04)

(58) Field of Classification Search
CPC B60C 11/0304; B60C 11/11; B60C 11/0306; B60C 11/0309; B60C 2011/0346; B60C 2011/0353; B60C 2011/0365

USPC ............................................ 152/209.8, 209.9
IPC .......................................................... B60C 11/11
See application file for complete search history.

(56) References Cited

U.S. PATENT DOCUMENTS

| 4,299,264 A * | 11/1981 | Williams .................. 152/209.18 |
| 5,293,918 A * | 3/1994 | Tsuda et al. ............... 152/209.8 |
| 2008/0202658 A1 | 8/2008 | Ikeda et al. |
| 2011/0120608 A1* | 5/2011 | Watabe ..................... 152/209.18 |

FOREIGN PATENT DOCUMENTS

WO    WO 2010005057 A1 *  1/2010 ............. B60C 11/03

* cited by examiner

*Primary Examiner* — Michael H Wilson
*Assistant Examiner* — Philip N Schwartz
(74) *Attorney, Agent, or Firm* — Birch, Stewart, Kolasch & Birch, LLP (57) ABSTRACT

A pneumatic tire has an asymmetrical tread pattern. An outboard central main circumferential groove extends zigzag and is made up of alternate minor and major groove segments. The major groove segments incline at an angle of from 5 to 30 degrees with respect to the tire circumferential direction. An inboard central main circumferential groove is widest in main circumferential grooves. Outboard middle axial grooves are widest in axial grooves. The distance Li of the widthwise center line of the straight inboard central main circumferential groove from the tire equator is less than the distance Lo of the amplitude center line of the zigzag outboard central main circumferential groove from the tire equator.

17 Claims, 3 Drawing Sheets

PNEUMATIC TIRE

BACKGROUND OF THE INVENTION

The present invention relates to a pneumatic tire, more particularly to a studless pneumatic tire having an asymmetrical tread pattern capable of improving performances on dry roads and wet roads as well as snowy/icy roads.

In recent years, even in a winter season, due to global warming, there is a tendency that opportunity to drive a passenger car with studless winter tires on dry roads and wet roads (not covered with snow or ice) is increased.

Heretofore, such a studless tire has been designed, giving weight to traction performance on snowy/icy roads, and usually employed a tread pattern made up of blocks provided with sipes. Therefore, there is room for improvement in performances on dry roads and wet roads, for example, noise performance (pattern noise), aquaplaning resistance (drainage) and the like.

SUMMARY OF THE INVENTION

It is an object of the present invention to provide a studless pneumatic tire, in which performances on dry roads and wet roads are improved without sacrificing performances on snowy/icy roads.

According to the present invention, a studless pneumatic tire comprises a tread portion provided with a tread pattern of left-right asymmetry defined by tread grooves and having an inboard tread edge to be positioned on the inside of a vehicle and an outboard tread edge to be positioned on the outside of the vehicle. The tread grooves include:

an inboard central main circumferential groove disposed on the inboard tread edge side of the tire equator;

an inboard shoulder main circumferential groove disposed on the inboard tread edge side of the inboard central main circumferential groove;

inboard middle axial grooves extending between the inboard central main circumferential groove and the inboard shoulder main circumferential groove to form inboard middle blocks;

inboard shoulder axial grooves extending between the inboard shoulder main circumferential groove and the inboard tread edge to form inboard shoulder blocks;

an outboard central main circumferential groove disposed on the outboard tread edge side of the tire equator;

an outboard shoulder main circumferential groove disposed on the outboard tread edge side of the outboard central main circumferential groove;

outboard middle axial grooves extending between the outboard central main circumferential groove and the outboard shoulder main circumferential groove to form outboard middle blocks;

outboard shoulder axial grooves extending between the outboard shoulder main circumferential groove and the outboard tread edge to from outboard shoulder blocks; and center axial grooves extending between the inboard central main circumferential groove and the outboard central main circumferential groove to form center blocks.

The outboard central main circumferential groove extends zigzag and is made up of alternate minor groove segments and major groove segments, the major groove segments inclining at an angle of from 5 to 30 degrees with respect to the tire circumferential direction.

The inboard central main circumferential groove has a groove width widest in the circumferential grooves.

The axial distance $Li$ of the widthwise center line of the inboard central main circumferential groove from the tire equator is less than the axial distance $Lo$ of the center line of the zigzag amplitude of the outboard central main circumferential groove from the tire equator.

The center axial grooves are connected to intersections between the major groove segments and the minor groove segments.

The outboard middle axial grooves are connected to intersections between the major groove segments and the minor groove segments.

The outboard middle axial grooves have a groove width widest in the axial grooves.

The pneumatic tire according to the present invention may be further provided with the following optional features:

the minor groove segments and the major groove segments are inclined to one circumferential direction toward the outboard tread edge from the tire equator so that the outboard central main circumferential groove has a sawtooth configuration;

the center axial grooves and the outboard middle axial grooves are inclined in the same direction as the minor groove segments;

the intersecting angle between the major groove segment and the minor groove segment is in a range of from 45 to 75 degrees;

the axial distance $Lo$ is 10 to 20% of the tread width between the inboard tread edge and outboard tread edge;

the groove width of the outboard middle axial groove gradually increases towards the outboard tread edge;

the groove depth of the center axial grooves and the groove depth of the outboard middle axial grooves are less than the groove depth of the minor groove segments; and the groove width of the inboard middle axial grooves is gradually increased from the inboard central main circumferential groove to the inboard shoulder main circumferential groove.

Therefore, the widest inboard central main circumferential groove can effectively remove water existing in the vicinity of the tire equator where the ground pressure is high during straight running, and wet performance can be improved.

Further, in the vicinity of the tire equator, the zigzag outboard central main circumferential groove is positioned outboard, therefore, by the increased axial component of the groove edges and increased groove volume, traction, grip performance on icy roads and snowy roads in particular during cornering can be improved.

Although, there is a possibility that a resonance of air column occurs in the widest inboard central main circumferential groove, this groove is positioned inboard, therefore, the resonance sound is hard to negatively affect noise performance.

Here, as well known in the tire art, the air column is that in a tube having open ends and stationary formed during running by the road surface and a part of a circumferential groove existing in the ground contacting patch of the tire.

In the case of the zigzag outboard central main circumferential groove, therefore, resonance of air column does not occur. Thus, the noise performance can be improved.

Since the center axial grooves and outboard middle axial grooves are connected to the outboard central main circumferential groove at the intersections between the major groove segments and minor groove segments, the axial grooves and minor groove segments cooperate to increase the shearing force of snow packed thereinto, therefore snowy road performance can be further improved.

Furthermore, as the outboard middle axial groove is widest, a large shearing force can be obtained during cornering, therefore, the snowy road performance during cornering can be improved.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflate to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The terms "outboard" and "inboard" are used toward the outboard tread edge and inboard tread edge, respectively, to refer relative positions with respect to the tire axial direction.

The tread edges are the axial outermost edges of the ground contacting patch (camber angle=0) in the normally inflated loaded condition.

The tread width is the axial distance between the tread edges measured in the normally inflated unloaded condition of the tire.

DESCRIPTION OF THE PREFERRED EMBODIMENTS

Embodiments of the present invention will now be described in detail in conjunction with the accompanying drawings.

In the drawings, the pneumatic tire according to the present invention is a studless tire for passenger cars.

Figure 1:
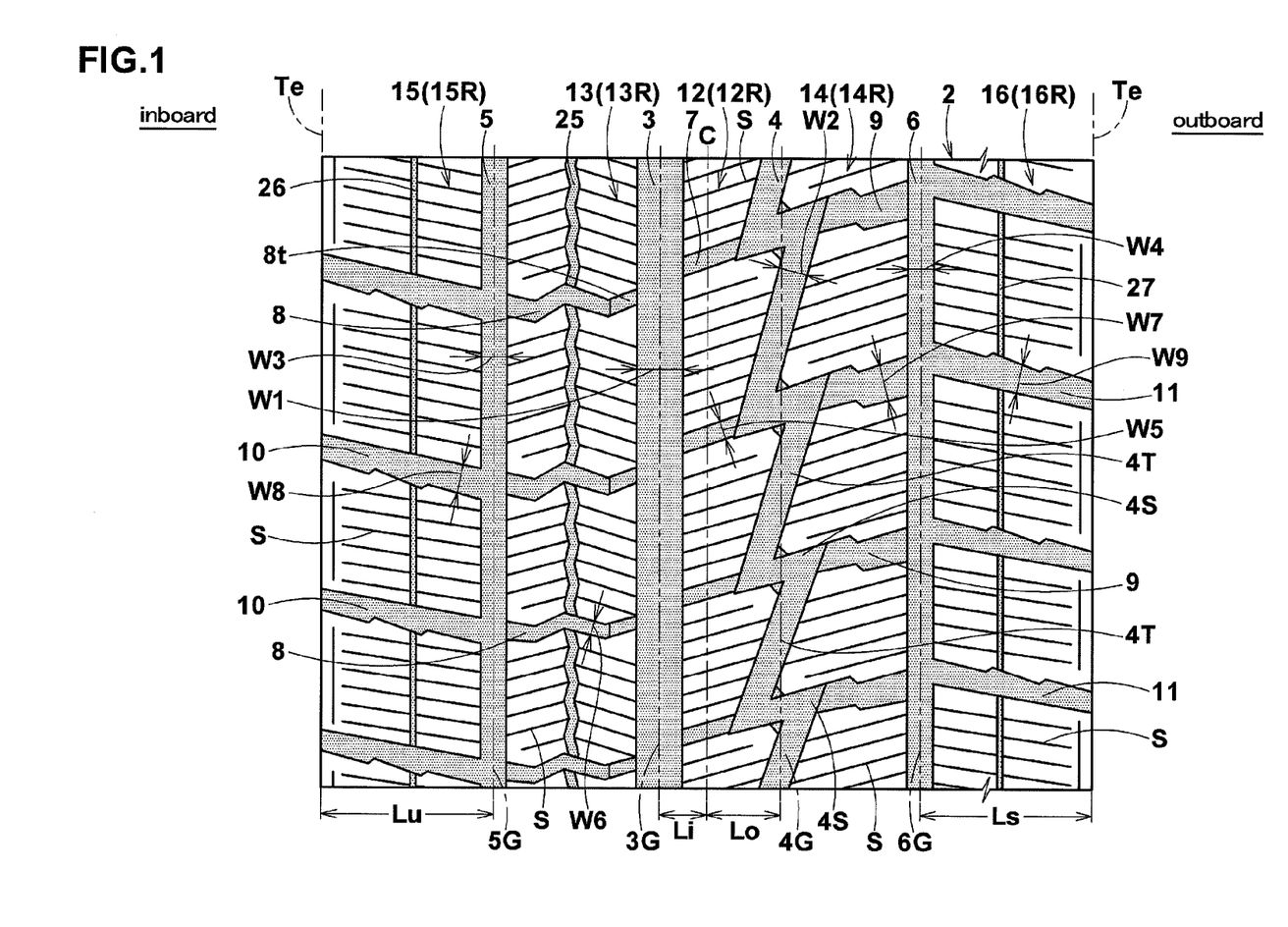
FIG. 1 is a developed partial view of the tread portion of a pneumatic tire according to the present invention showing a tread pattern.

In this embodiment, as shown in FIG. 1, the tire is provided with a tread pattern of left-right asymmetry (asymmetry about the tire equator c), and the mounting position of the tire is specified. Specifically, the tread portion 2 has an outboard tread edge to be positioned away from the center of a vehicle body and an inboard tread edge to be positioned close to the center of the vehicle body.

The tread portion 2 is provided with tread grooves defining the tread pattern.

The tread grooves include main circumferential grooves extending circumferentially of the tire which are:

an inboard central main circumferential groove 3 extending straight on the inboard tread edge side of the tire equator C;

an outboard central main circumferential groove 4 extending zigzag on the outboard tread edge side of the tire equator c;

an inboard shoulder main circumferential groove 5 extending straight on the inboard tread edge side of the inboard central main circumferential groove 3; and an outboard shoulder main circumferential groove 6 extending straight on the outboard tread edge side of the outboard central main circumferential groove 4.

The tread grooves further include axial grooves which are:

a plurality of center axial grooves 7 extending between the inboard central main circumferential groove 3 and the outboard central main circumferential groove 4;

a plurality of inboard middle axial grooves 8 extending between the inboard central main circumferential groove 3 and the inboard shoulder main circumferential groove 5;

a plurality of outboard middle axial grooves 9 extending between the outboard central main circumferential groove 4 and the outboard shoulder main circumferential groove 6;

a plurality of inboard shoulder axial grooves 10 extending between the inboard shoulder main circumferential groove 5 and the inboard tread edge Te; and a plurality of outboard shoulder axial grooves 11 extending between the outboard shoulder main circumferential groove 6 and the outboard tread edge Te.

Thereby, the tread portion 2 is provided with:

a row 12R of circumferentially arranged center blocks 12 defined by the inboard central main circumferential groove 3, the outboard central main circumferential groove 4 and the center axial grooves 7;

a row 13R of circumferentially arranged inboard middle blocks 13 defined by the inboard central main circumferential groove 3, the inboard shoulder main circumferential groove 5 and the inboard middle axial grooves 8;

a row 14R of circumferentially arranged outboard middle blocks 14 defined by the outboard central main circumferential groove 4, the outboard shoulder main circumferential groove 6 and the outboard middle axial grooves 9;

a row 15R of circumferentially arranged inboard shoulder blocks 15 defined by the inboard shoulder main circumferential groove 5, the inboard tread edge Te and the inboard shoulder axial grooves 10; and a row 16R of circumferentially arranged outboard shoulder blocks 16 defined by the outboard shoulder main circumferential groove 6, the outboard tread edge Te and the outboard shoulder axial grooves 11.

These blocks 12-16 are each provided with a plurality of sipes S inclined with respect to the tire axial direction.

In the main circumferential grooved 3-6, the inboard central main circumferential groove 3 has a largest groove width w1. Preferably, the groove width w1 is set in a range of from 4 to 8% of the tread width TW.

The inboard central main circumferential groove 3 has groove edges each extending straight in parallel with the tire circumferential direction, and the groove width w1 is constant along the entire length.

In this application, the term "groove width" means a width measured perpendicularly to a center line of the groove at the groove top.

The outboard central main circumferential groove 4 is a zigzag groove made up of alternately arranged major groove segments 4T and minor groove segments 4S. The major groove segments 4T are inclined at an angle θ1 of from 5 to 30 degrees with respect to the tire circumferential direction. The minor groove segment 4S are shorter than the major groove segments 4T and inclined at an angle larger then the angle θ1. Preferably, the angle θ1 is set in a range of not less than 15 degrees and not more than 25 degrees.

If the angle θ1 is less than 5 degrees, as the axial component of the groove edges decreases, it becomes difficult to improve the snowy road performance. If the angle θ1 is more than 30 degrees, self-discharging of the snow packed in the groove is hindered, and the rigidity of the center blocks 12 and outboard middle blocks 14 tend to become insufficient.

In this embodiment, the minor groove segments 4S and the major groove segments 4T are inclined to one circumferential direction toward the outboard tread edge Te from the tire equator C so that the outboard central main circumferential groove 4 has a sawtooth configuration. Therefore, the shearing force is further increased because the groove length and groove volume are increased and the volume of the packed snow is increased. Further, the snow in the groove is further compressed against the corners between the minor groove segments 4S and major groove segments 4T to become more hardened. The snowy road performance can be further improved. Further, the occurrence of air column resonance is prevented.

In order to obtain such advantageous effects, preferably, the intersecting angle θ2 between the major groove segment 4T and minor groove segment 4S is set in a range of not less than 45 degrees, more preferably not less than 50 degrees, but not more than 75 degrees, more preferably not more than 70 degrees.

The groove width w2 of the outboard central main circumferential groove 4 is preferably set in a range of from 2 to 5% of the tread width TW.

The axial distance Li of the widthwise center line 3G of the inboard central main circumferential groove 3 from the tire equator c is set to be less than the axial distance Lo of the amplitude center line 4G of zigzag of the outboard central main circumferential groove 4 from the tire equator C. Preferably, the ratio Lo/Li of the axial distances Lo and Li is set in a range of not less than 1.2, more preferably not less than 1.3, but not more than 1.8, more preferably not more than 1.7. Therefore, the vicinity of the tire equator C (center block 12) is provided with sufficient rigidity and the straight running stability can be improved. If the ratio Lo/Li is more than 1.7, there is a possibility that disruption of rigidity balance is caused between the center blocks 12 and outboard middle blocks 14, and the packed snow's shearing force is decreased.

In order to obtain such advantageous effects, the axial distance Lo of the outboard central main circumferential groove 4 is preferably set in a range of not less than 10%, more preferably not less than 13%, but not more than 20%, more preferably not more than 17% of the tread width TW.

Each of the inboard shoulder main circumferential groove 5 and the outboard shoulder main circumferential groove 6 has groove edges each extending straight in parallel with the tire circumferential direction, and the groove width is constant along the entire length.

Preferably, the groove width w3 of the inboard shoulder main circumferential groove 5 and the groove width w4 of the outboard shoulder main circumferential groove 6 are set in a range of from 2.5 to 4.5% of the tread width TW to improve the drainage and block rigidity in a well balanced manner.

Preferably, the groove depth D1 of the inboard central main circumferential groove 3, the groove depth D2 of the outboard central main circumferential groove 4, the groove depth D3 of the inboard shoulder main circumferential groove 5 and the groove depth D4 of the outboard shoulder main circumferential groove 6 are set in a range of from 8.5 to 9.5 mm. In this embodiment, the groove depths D1-D4 have substantially identical values.

In order to maintain the rigidity of the blocks 12-16 in a well balanced manner, the axial distance Lu of the widthwise center line 5G of the inboard shoulder main circumferential groove 5 from the inboard tread edge Te is preferably set in a range of not less than 14%, more preferably not less than 18%, but not more than 30%, more preferably not more than 26% of the tread width TW.

The axial distance Ls of the widthwise center line 6G of the outboard shoulder main circumferential groove 6 from the outboard tread edge Te is preferably set in a range of not less than 14%, more preferably not less than 18%, but not more than 30%, more preferably not more than 26% of the tread width TW.

Figure 2:
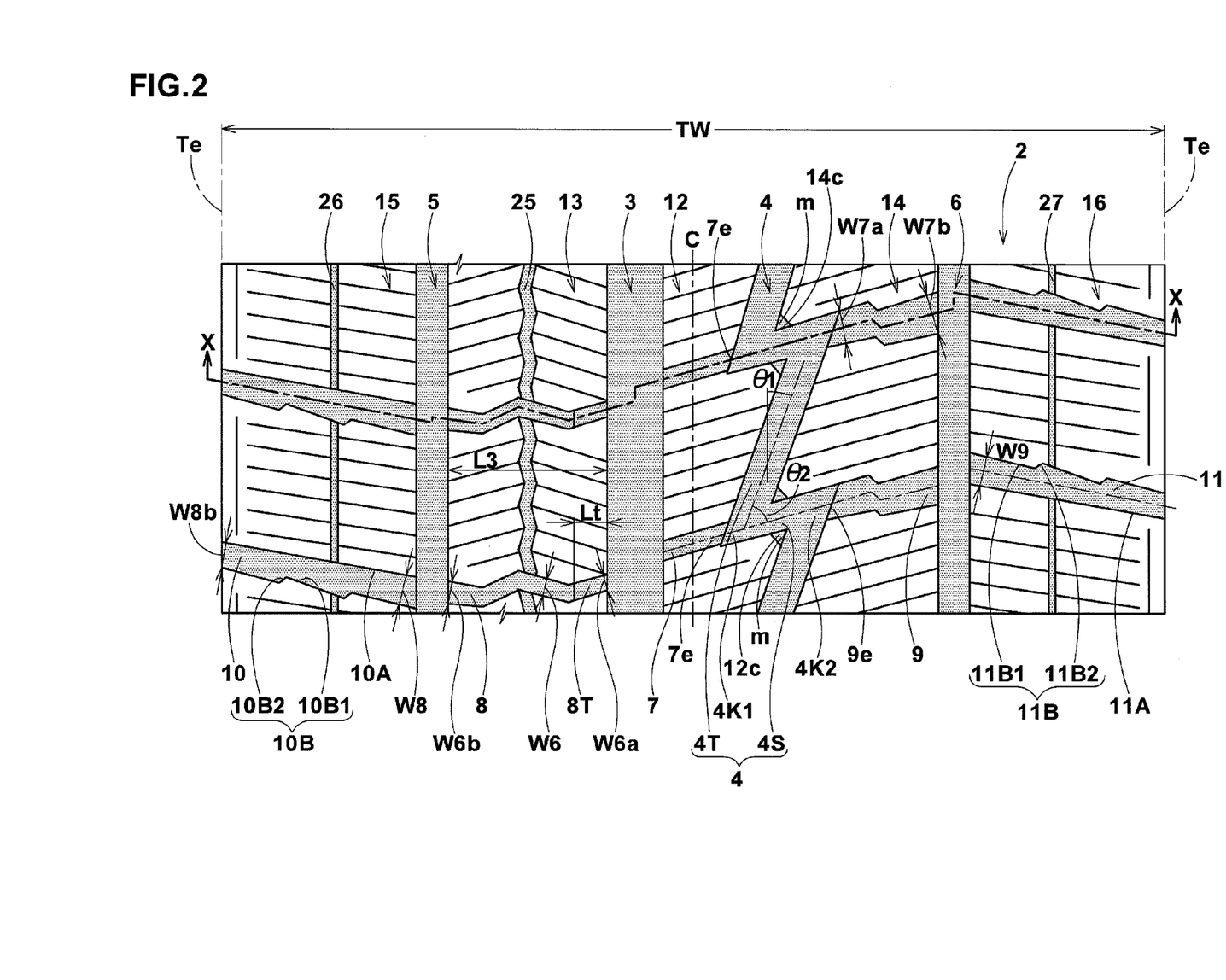
FIG. 2 is an enlarged partial view of the tread pattern.

In this embodiment, as shown in FIG. 2, the center axial groove 7 extends straight to have a constant groove width.

The ends 7e (on the outboard tread edge side) of the center axial groove 7 are connected to intersections 4K1 (on the inboard tread edge side) between the major groove segments 4T and the minor groove segment 4S.

The center axial grooves 7 are inclined to one circumferential direction same as the minor groove segments 4S. Preferably, the center axial grooves 7 are inclined at the same angle as the minor groove segments 4S with respect to the tire axial direction. Thereby, the snowy road performance can be further improved.

It is preferable that the groove depth D5 of the center axial groove 7 is less than the groove depth D2s of the minor groove segment 4S to lessen the propagation of possible air column resonance sound from the inboard central main circumferential groove 3 to the outboard central main circumferential groove 4.

In this embodiment, as shown in FIG. 2, the inboard middle axial groove 8 extends zigzag from its end on the tire equator side to its end on the inboard tread edge side to increase the groove volume and thereby to increase the shearing force of the snow packed therein.

In this embodiment, the groove width w6 of the inboard middle axial groove 8 gradually increases from the inboard central main circumferential groove 3 to the inboard shoulder main circumferential groove 5 to enhance the drainage toward the inboard tread edge side.

Preferably, the inboard middle axial groove 8 has a ratio w6a/w6b of the groove width w6a measured at the end on the tire equator side to the groove width w6b measured at the end on the inboard tread edge side which is not less than 1.1, more preferably not less than 1.3, but not more than 1.9, more preferably not more than 1.7. If the ratio w6a/w6b is more than 1.9, there is a possibility that the noise performance deteriorates and the rigidity of the inboard middle block 13 becomes insufficient.

Figure 3:
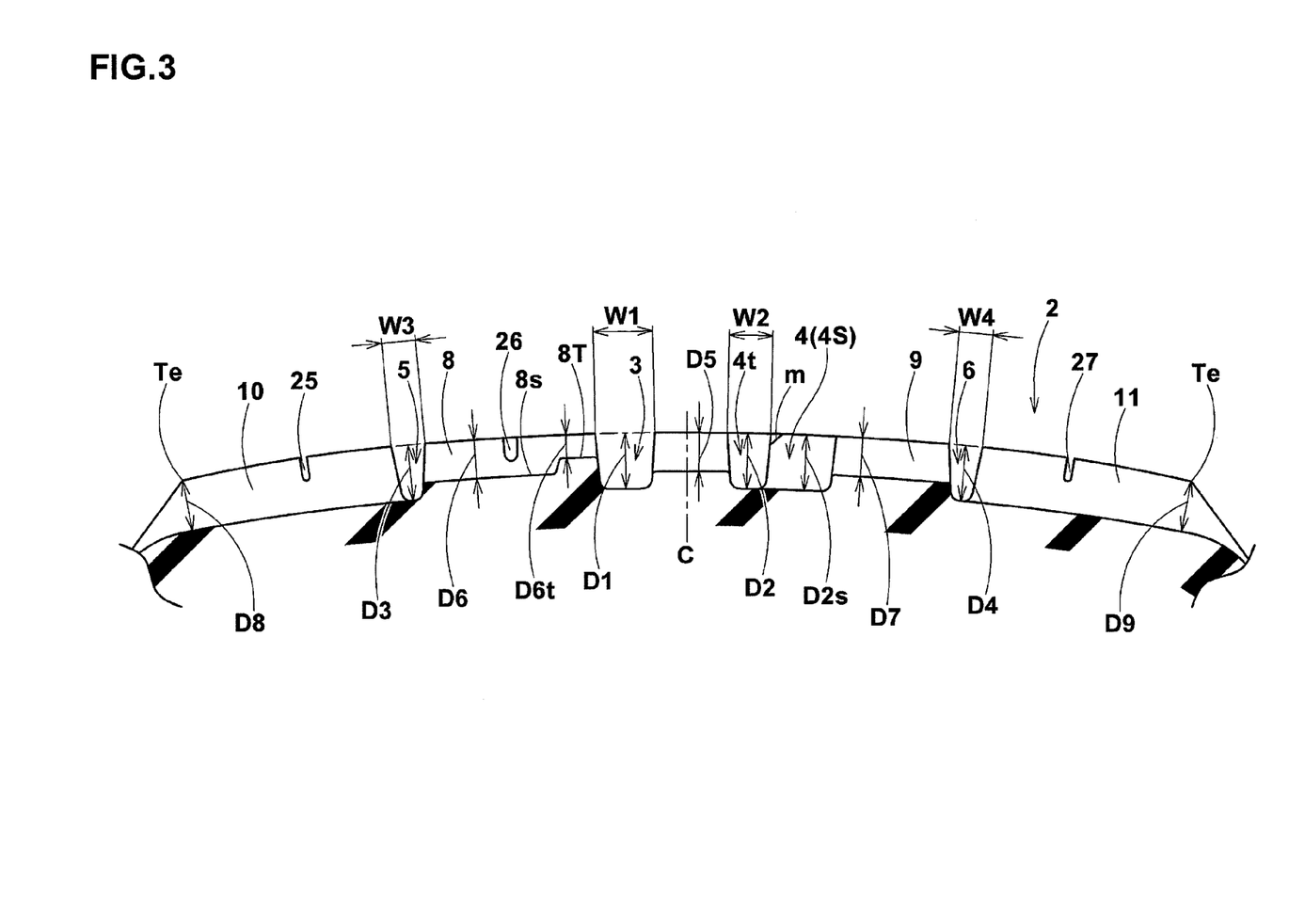
FIG. 3 is a cross sectional partial view of the tread portion taken along line X-X in FIG. 2.

As shown in FIG. 3, preferably, the inboard middle axial groove 8 is provided in a tire-equator-side part thereof with a tie bar 8T protruding from the groove bottom 8s to increase the apparent rigidity the inboard middle blocks 13.

Preferably, the axial length Lt of the tie bar 8T is not less than 10%, more preferably not less than 15%, but preferably not more than 30%, more preferably not more than 25% of the axial length L3 of the inboard middle axial groove 8 or the block width L3 of the inboard middle block 13. If the axial length Lt is more than 30%, there is a possibility that drainage and snowy road performance are deteriorated.

The ends 9e (on the inboard tread edge side) of the outboard middle axial grooves 9 are connected to intersections 4K2 (on the outboard tread edge side) between the major groove segments 4T and the minor groove segments 4S of the outboard central main circumferential groove 4.

In order to improve the snowy road performance, the outboard middle axial groove 9 is a zigzag groove which extends from the outboard central main circumferential groove 4 while inclining to one circumferential direction, then at a substantially middle point of the axial length of the outboard middle axial groove 9, inclines to the other circumferential direction and extends for a short distance, and then again inclines to one circumferential direction and extends to the outboard shoulder main circumferential groove 6.

The groove width W7 of the outboard middle axial groove 9 is largest in the axial grooves 7-11 in order to obtain a large snow shearing force during cornering and thereby improve the snowy road performance during cornering.

Preferably, the groove width w7 of the outboard middle axial groove 9 is gradually increased toward the outboard tread edge to enhance the drainage from the outboard central main circumferential groove 4 to the outboard shoulder main circumferential groove 6.

Preferably, the outboard middle axial groove 9 has a ratio W7b/W7a of the groove width w7b measured at the end on the outward tread edge side to the groove width w7a measured at the end on the inward tread edge side which is not less than 1.05, more preferably not less than 1.1, but not more than 1.5, more preferably not more than 1.3.

If the ratio w7b/w7a is more than 1.5, there is a possibility that noise performance deteriorates and the rigidity of the outboard middle block 14 becomes insufficient.

The outboard middle axial grooves 9 are inclined to one circumferential direction same as the minor groove segments 4S. Preferably, the outboard middle axial grooves 9 are inclined at the same angle as the minor groove segments 4S with respect to the tire axial direction so that the center axial groove 7, minor groove segment 4S and outboard middle axial groove 9 are arranged in line and thereby drainage from the inboard central main circumferential groove 3 to the outboard shoulder main circumferential groove 6 can be further improved.

The groove depth D7 of the outboard middle axial groove 9 is set to be less than the groove depth D2s of the minor groove segment 4S to block the propagation of the air column resonance sound from the inboard central main circumferential groove 3 toward the outboard tread edge.

In this embodiment, as shown in FIG. 2, the inboard shoulder axial groove 10 has a straight edge (flat sidewall) 10A and a zigzag edge (zigzag sidewall) 10B. The straight edge 10A inclines with respect to the tire axial direction. The zigzag edge 10B is made up of alternate long edge segments 10B1 and short edge segments 10B2, wherein the long edge segments 10B1 gently incline to one circumferential direction, and the short edge segments 10B2 steeply incline to the opposite circumferential direction to achieve smooth drainage, increased snow shearing force, increased edge effect on icy roads and improved pattern noise.

Similarly to the inboard shoulder axial groove 10, the outboard shoulder axial groove 11 has a straight edge (flat sidewall) 11A and a zigzag edge (zigzag sidewall) 11B. The straight edge 11A inclines with respect to the tire axial direction. The zigzag edge 11B is made up of alternate long edge segments 11B1 and short edge segments 11B2, wherein the long edge segments 11B1 gently incline to one circumferential direction, and the short edge segments 11B2 steeply incline to the opposite circumferential direction for the same reason as the inboard shoulder axial groove 10.

The ratio w8b/w1 of the groove width W8b of the inboard shoulder axial groove 10 measured at the inboard tread edge Te to the groove width W1 of the inboard central main circumferential groove 3 is preferably set in a range of not less than 0.60, more preferably not less than 0.65, but not more than 0.80, more preferably not more than 0.75.

If the ratio W8b/W1 is more than 0.80, there is a possibility that the rigidity of the inboard shoulder block 15 becomes insufficient, and noise performance deteriorates. If the ratio W8b/W1 is less than 0.60, the drainage toward the inboard tread edge decreases.

Preferably, the groove width w5 of the center axial groove 7 is 30 to 40% of the groove width w1 of the inboard central main circumferential groove 3, the groove width w6 of the inboard middle axial groove 8 is 28 to 38% of the groove width w1, the groove width w7 of the outboard middle axial groove 9 is 60 to 70% of the groove width w1, the groove width w8 of the inboard shoulder axial groove 10 is 45 to 55% of the groove width w1, and the groove width w9 of the outboard shoulder axial groove 11 is 45 to 55% of the groove width w1.

Further, the groove depth D5 of the center axial groove 7 is 7.5 to 8.5 mm, the groove depth D6 of the inboard middle axial groove 8 is 7.5 to 8.5 mm, the groove depth D7 of the outboard middle axial groove 9 is 7.5 to 8.5 mm, the groove depth D8 of the inboard shoulder axial groove 10 is 8.0 to 9.0 mm, the groove depth D9 of the outboard shoulder axial groove 11 is 8.0 to 9.0 mm, and the groove depth D6t of the tie bar 8T of the inboard middle axial groove 8 is 5.0 to 7.0 mm.

The acute-angled corners 12c and 14c of the center blocks 12 and outboard middle blocks 14 formed between the minor groove segments 4S and the major groove segments 4T are chamfered by a triangular slope (m) in order that uneven wear does not start from the corners and the corners are hard to be torn off.

Further, the tread portion 2 can be provided with narrow circumferential grooves each narrower than any one of the main circumferential grooves.

In this embodiment, the narrow circumferential grooves include: an inboard middle narrow circumferential groove 25 extending zigzag and circumferentially across the inboard middle blocks 13 to improve the snowy road performance. Further, the narrow circumferential grooves include: an inboard shoulder narrow circumferential groove 26 extending straight and circumferentially across the inboard shoulder blocks 15, and an outboard shoulder narrow circumferential groove 27 extending straight and circumferentially across the outboard shoulder blocks 16 to improve lateral grip during cornering.

Not to cause disruption of a rigidity balance in the blocks 13-16, it is desirable that the narrow circumferential grooves pass through axial central zones of the respective blocks between 40% and 60% of the axial width of the respective blocks 13-16.

Comparison Tests

Based on the tread pattern shown in FIG. 1 and specifications shown in Table 1, pneumatic tires of size 195/65R15 (rim size 6.03×15) for passenger cars were prepared and tested as follows.
Common specifications are as follows:

| | |
|---|---|
| tread width TW: | 165 mm |
| <inboard central main circumferential groove> | |
| groove width W1: | 5.8% of TW |
| groove depth D1: | 9.0 mm |
| <outboard central main circumferential groove> | |
| groove width W2: | 4.2% of TW |
| groove depth D2: | 9.0 mm |
| <inboard shoulder main circumferential groove> | |
| groove width W3: | 3.3% of TW |
| groove depth D3: | 9.0 mm |
| position Lu: | 18.8% of TW |
| <outboard shoulder main circumferential groove> | |
| groove width W4: | 3.3% of TW |
| groove depth D4: | 9.0 mm |
| position Ls: | 18.8 of TW |
| <center axial groove> | |
| groove width W5: | 4.0 mm |
| groove depth D5: | 8.0 mm |
| <inboard middle axial groove> | |
| groove width W6: | 3.5 to 4.0 mm |
| groove depth D6: | 8.0 mm (6.0 mm at tie bar) |
| tie bar length Lt: | 22% of L3 |
| <outboard middle axial groove> | |
| groove width W7: | 6.0 to 8.0 mm |
| groove depth D7: | 8.0 mm |
| <inboard shoulder axial groove> | |
| groove width W8: | 6.0 to 6.5 mm |
| groove depth D8: | 9.0 mm |
| <outboard shoulder axial groove> | |
| groove width W9: | 6.0 to 7.0 mm |
| groove depth D9: | 9.0 mm |
| <sipes> | |
| width: | 0.3 to 0.8 mm |
| depth: | 2.0 to 8.0 mm |

<Snowy Road Performance and Dry Road Performance Test>

The test tires were attached to a 2000 cc rear-wheel-drive passenger car. (tire pressure 200 kPa). During running on a snowy road and dry road (asphalt road) in a test course, the test driver evaluated the snowy road performance and dry road performance based on the steering response, rigid-feeling, road grip and the like. The results are indicated in Table 1 using an index based on comparative example tire Ref. 1 being 100, wherein the larger the value, the better the performance.

<On-Ice Braking Performance Test>

During the above-mentioned test car was run on an icy road at a speed of 30 km/h, full brake was applied, and the running distance to stop was measured. The reciprocal running distance is indicated in Table 1 using an index based on comparative example tire Ref. 1 being 100. The larger the value, the better the performance.

<Drainage Test (Lateral Aquaplaning Test)>

The test car was run along a 100 meter radius circle on an asphalt road partially provided with a 10 mm depth 20 m long water pool, and the lateral acceleration (lateral G) during running in the water pool was measured at the front wheels, gradually increasing the speed entering into the water pool, to obtain the average for the speed range of from 55 to 80 km/h. The results are indicated in Table 1 using an index based on comparative example tire Ref. 1 being 100. The larger the value, the better the performance.

<Noise Performance Test>

During the test car was running on a dry roughened asphalt road surface at a speed of 60 km/hr, noise sound was measured in the inside of the car. The measuring position was near the driver's ear on the outside or window side of the car. Measured was the sound pressure level of a peak occurring at a frequency near 240 Hz—this frequency corresponds to that of the primary resonance mode of the annular air mass in the tire cavity. The reciprocal sound pressure level is indicated in Table 1 using an index based on comparative example tire Ref. 1 being 100. The larger the value, the better the performance.

The test results show that the performances of Embodiment tires were comprehensively improved when compared with comparative example tires Ref. 1-3.

TABLE 1

| Tire | Ref. 1 | Ex. 1 | Ex. 2 | Ex. 3 | Ref. 2 | Ref. 3 | Ex. 4 |
|---|---|---|---|---|---|---|---|
| major groove segment angle θ1 (deg.) | 0 | 20 | 5 | 30 | 35 | 20 | 20 |
| distance ratio Lo/Li | 1.5 | 1.5 | 1.5 | 1.5 | 1.5 | 1 | 1.2 |
| intersecting angle θ2 (deg.) | 60 | 60 | 60 | 60 | 60 | 60 | 60 |
| distance Lo/tread width TW (%) | 15 | 15 | 15 | 15 | 15 | 15 | 15 |
| groove width ratio W8b/W1 | 0.7 | 0.7 | 0.7 | 0.7 | 0.7 | 0.7 | 0.7 |
| snowy road performance | 100 | 120 | 115 | 115 | 105 | 110 | 120 |
| On-ice braking performance | 100 | 120 | 110 | 115 | 110 | 115 | 120 |
| drainage | 100 | 100 | 100 | 100 | 95 | 95 | 100 |
| noise performance | 100 | 100 | 100 | 105 | 100 | 100 | 100 |
| dry road performance | 100 | 100 | 105 | 95 | 95 | 90 | 95 |

| Tire | Ex. 5 | Ex. 6 | Ex. 7 | Ex. 8 | Ex. 9 | Ex. 10 | Ex. 11 |
|---|---|---|---|---|---|---|---|
| major groove segment angle θ1 (deg.) | 20 | 20 | 20 | 20 | 20 | 20 | 20 |
| distance ratio Lo/Li | 1.8 | 2.0 | 1.5 | 1.5 | 1.5 | 1.5 | 1.5 |
| intersecting angle θ2 (deg.) | 60 | 60 | 40 | 45 | 75 | 80 | 60 |
| distance Lo/tread width TW (%) | 15 | 15 | 15 | 15 | 15 | 15 | 8 |
| groove width ratio W8b/W1 | 0.7 | 0.7 | 0.7 | 0.7 | 0.7 | 0.7 | 0.7 |
| snowy road performance | 120 | 115 | 115 | 115 | 110 | 110 | 115 |
| On-ice braking performance | 120 | 120 | 120 | 120 | 120 | 120 | 115 |
| drainage | 100 | 100 | 95 | 100 | 105 | 105 | 100 |

TABLE 1-continued

| | | | | | | | |
|---|---|---|---|---|---|---|---|
| noise performance | 100 | 100 | 100 | 100 | 95 | 90 | 100 |
| dry road performance | 95 | 90 | 90 | 95 | 100 | 100 | 90 |

| Tire | Ex. 12 | Ex. 13 | Ex. 14 | Ex. 15 | Ex. 16 | Ex. 17 | Ex. 18 |
|---|---|---|---|---|---|---|---|
| major groove segment angle θ1 (deg.) | 20 | 20 | 20 | 20 | 20 | 20 | 20 |
| distance ratio Lo/Li | 1.5 | 1.5 | 1.5 | 1.5 | 1.5 | 1.5 | 1.5 |
| intersecting angle θ2 (deg.) | 60 | 60 | 60 | 60 | 60 | 60 | 60 |
| distance Lo/tread width TW (%) | 10 | 20 | 22 | 15 | 15 | 15 | 15 |
| groove width ratio W8b/W1 | 0.7 | 0.7 | 0.7 | 0.5 | 0.6 | 0.8 | 0.9 |
| snowy road performance | 120 | 120 | 115 | 105 | 110 | 120 | 120 |
| On-ice braking performance | 120 | 120 | 120 | 120 | 120 | 115 | 110 |
| drainage | 100 | 100 | 100 | 90 | 95 | 100 | 105 |
| noise performance | 100 | 100 | 100 | 105 | 105 | 95 | 90 |
| dry road performance | 95 | 95 | 90 | 105 | 100 | 100 | 95 |

The invention claimed is:

1. A pneumatic tire comprising a tread portion having an inboard tread edge and an outboard tread edge and provided with an asymmetrical tread pattern defined by tread grooves, the tread grooves including:
an inboard central main circumferential groove disposed on the inboard tread edge side of the tire equator;
an inboard shoulder main circumferential groove disposed on the inboard tread edge side of the inboard central main circumferential groove;
inboard middle axial grooves extending between the inboard central main circumferential groove and the inboard shoulder main circumferential groove to form inboard middle blocks;
inboard shoulder axial grooves extending between the inboard shoulder main circumferential groove and the inboard tread edge to form inboard shoulder blocks;
an outboard central main circumferential groove disposed on the outboard tread edge side of the tire equator;
an outboard shoulder main circumferential groove disposed on the outboard tread edge side of the outboard central main circumferential groove;
outboard middle axial grooves extending between the outboard central main circumferential groove and the outboard shoulder main circumferential groove to form outboard middle blocks;
outboard shoulder axial grooves extending between the outboard shoulder main circumferential groove and the outboard tread edge to from outboard shoulder blocks; and
center axial grooves extending between the inboard central main circumferential groove and the outboard central main circumferential groove to form center blocks,
wherein
the outboard central main circumferential groove extends zigzag and is made up of alternate minor groove segments and major groove segments, the major groove segments inclining at an angle of from 5 to 30 degrees with respect to the tire circumferential direction,
the inboard central main circumferential groove has a groove width widest in the circumferential grooves,
the axial distance Li of the widthwise center line of the inboard central main circumferential groove from the tire equator is less than the axial distance Lo of the center line of the zigzag amplitude of the outboard central main circumferential groove from the tire equator,
the center axial grooves are connected to intersections between the major groove segments and the minor groove segments,
the center axial grooves have a substantially constant groove width,
the outboard middle axial grooves are connected to intersections between the major groove segments and the minor groove segments,
the outboard middle axial grooves are gradually increased in the groove width towards the outboard tread edge to have a groove width widest in the axial grooves,
each said outboard shoulder axial groove has two edges, one of which is straight, and the other of which is zigzag,
each said inboard shoulder axial groove has two edges, one of which is straight, and the other of which is zigzag, and
each said inboard middle axial groove is a zigzag groove.

2. The pneumatic tire according to claim 1, wherein
the minor groove segments and the major groove segments are inclined to one circumferential direction toward the outboard tread edge from the tire equator so that the outboard central main circumferential groove has a sawtooth configuration.

3. The pneumatic tire according to claim 1, wherein
the center axial grooves and the outboard middle axial grooves are inclined in the same direction as the minor groove segments.

4. The pneumatic tire according to claim 1, wherein
the intersecting angle between the major groove segment and the minor groove segment is in a range of from 45 to 75 degrees.

5. The pneumatic tire according to claim 1, wherein
the axial distance Lo is 10 to 20% of the tread width between the inboard tread edge and outboard tread edge.

6. The pneumatic tire according to claim 1, wherein
the groove depth of the center axial grooves and the groove depth of the outboard middle axial grooves are less than the groove depth of the minor groove segments.

7. The pneumatic tire according to claim 1, wherein
the groove width of the inboard middle axial grooves is gradually increased from the inboard central main circumferential groove to the inboard shoulder main circumferential groove.

8. The pneumatic tire according to claim 2, wherein
the center axial grooves and the outboard middle axial grooves are inclined in the same direction as the minor groove segments.

9. The pneumatic tire according to claim 2, wherein
the intersecting angle between the major groove segment and the minor groove segment is in a range of from 45 to 75 degrees.

10. The pneumatic tire according to claim 3, wherein
the intersecting angle between the major groove segment and the minor groove segment is in a range of from 45 to 75 degrees.

11. The pneumatic tire according to claim 2, wherein
the axial distance Lo is 10 to 20% of the tread width between the inboard tread edge and outboard tread edge.

12. The pneumatic tire according to claim 3, wherein
the axial distance Lo is 10 to 20% of the tread width
between the inboard tread edge and outboard tread edge.
13. The pneumatic tire according to claim 4, wherein
the axial distance Lo is 10 to 20% of the tread width
between the inboard tread edge and outboard tread edge.
14. The pneumatic tire according to claim 2, wherein
the groove depth of the center axial grooves and the groove
depth of the outboard middle axial grooves are less than
the groove depth of the minor groove segments.
15. The pneumatic tire according to claim 3, wherein
the groove depth of the center axial grooves and the groove
depth of the outboard middle axial grooves are less than
the groove depth of the minor groove segments.
16. The pneumatic tire according to claim 1, wherein
in each of the outboard shoulder axial grooves,
the zigzag edge thereof is composed of alternate long segments and short segments, and
each long segment is inclined with respect to the straight edge thereof so that the groove width increases toward the outboard shoulder main circumferential groove.
17. The pneumatic tire according to claim 1, wherein
in each of the inboard shoulder axial grooves,
the zigzag edge thereof is composed of alternate long segments and short segments, and
each long segment is inclined with respect to the straight edge thereof so that the groove width increases toward the inboard shoulder main circumferential groove.

* * * * *